United States Patent
Putterman

[11] Patent Number: 5,906,492
[45] Date of Patent: May 25, 1999

[54] EDUCATIONAL PHONETIC CARD GAME USING TAPE RECORDED PRONUNCIATION

[76] Inventor: Margaret Putterman, P.O. Box 940254, Rockaway Park, N.Y. 11694

[21] Appl. No.: 08/998,458

[22] Filed: Dec. 26, 1997

[51] Int. Cl.[6] ................................................. G09B 5/06
[52] U.S. Cl. ..................... 434/169; 434/171; 434/167; 434/172; 434/185; 273/299; 273/302
[58] Field of Search ...................... 273/299, 302; 434/159, 169, 171, 172, 185; D21/385, 386, 390

[56] References Cited

U.S. PATENT DOCUMENTS

| 422,682 | 3/1890 | Young | 273/296 |
|---|---|---|---|
| 1,312,278 | 8/1919 | Shinn | 273/299 |
| 2,265,334 | 12/1941 | Armbruster | 273/299 |
| 2,607,595 | 8/1952 | Mathes | 434/428 |
| 3,654,712 | 4/1972 | Bagdasar | 35/35 |
| 4,031,634 | 6/1977 | Stastny et al. | 434/311 |
| 4,192,513 | 3/1980 | Feeley . | |
| 4,219,197 | 8/1980 | Acuff | 434/172 |
| 4,237,624 | 12/1980 | Yeh | 434/169 |
| 4,306,725 | 12/1981 | Sawyer | 273/302 |
| 4,650,423 | 3/1987 | Sprague et al. | 434/156 |
| 4,731,027 | 3/1988 | Phinney | 434/169 |
| 4,826,175 | 5/1989 | Quatrino | 273/299 |
| 4,877,255 | 10/1989 | Von Braunhut | 273/299 |
| 5,108,113 | 4/1992 | Leach | 273/302 |
| 5,310,347 | 5/1994 | Brand . | |
| 5,368,305 | 11/1994 | Rodda et al. . | |
| 5,417,432 | 5/1995 | Dwyer | 273/299 |
| 5,524,899 | 6/1996 | Haqedorn | 273/299 |
| 5,556,283 | 9/1996 | Stendardo et al. | 434/169 |
| 5,615,886 | 4/1997 | Chalfin et al. | 273/272 |

*Primary Examiner*—Jessica J. Harrison
*Assistant Examiner*—David A. Fleming
*Attorney, Agent, or Firm*—Michael I. Kroll

[57] ABSTRACT

A educational card game for teaching phonetic pronunciation of words and letters. The educational card game includes a plurality of cards, each of the plurality of cards includes a face side and represents a different letter of the alphabet. The letter of the alphabet represented by each card is printed in a central portion of the face side and a point value assigned to each card is printed in a corner of the face side. A device for storing data representing an oral pronunciation of each letter printed on each of the plurality of cards is included to provide a correct oral pronunciation of each letter on each card. The data representing the phonetic pronunciation of each letter is assigned a respective location within the data storage device. A key is also included to match each of the plurality of cards with the location at which its respective data is stored whereby each of the plurality of cards represents a phonetic pronunciation of its respective letter, the point value assigned to each card is representative of a difficulty level of the phonetic pronunciation and a user may readily hear an oral pronunciation of the letter printed on each card by determining the position at which the appropriate data is stored on the data storage device using the key and retrieving the appropriate data from the data storage device.

11 Claims, 5 Drawing Sheets

EDUCATIONAL PHONETIC CARD GAME USING TAPE RECORDED PRONUNCIATION

BACKGROUND OF THE INVENTION

1. Field of the Invention

The present invention relates generally to card games and learning tools and, more specifically, to an educational card game and learning tool for teaching children how to correctly pronounce letters and words.

2. Description of the Prior Art

Numerous card games and learning tools have been provided in the prior art. For example, U.S. Pat. Nos. 4,192,513; 5,108,113; 5,310,347; 5,368,305 and 5,524,899 all are illustrative of such prior art. While these units may be suitable for the particular purpose to which they address, they would not be as suitable for the purposes of the present invention as heretofore described.

Playing cards are disclosed having a unique diamond shape that facilitates the handling and display of the cards. A three-letter sequence is imprinted centrally on the front face of each card, the letters forming a natural alphabetic sequence. The second letter in the sequence is also imprinted near the upper and lower corners of each card in mutually inverted orientations so as to be readily visible and recognizable from either end of the card. The cards are divided into four suits such as diamonds, hearts, spades and clubs. Each of the cards has a corresponding suit symbol imprinted near the upper and lower corners thereof again in mutually inverted orientations so as to be recognizable from either end of the card. There are preferably twenty-six cards in each suit with each suit having cards with a second letter in the three-letter sequence corresponding to the letters of the alphabet from "A" to "Z". The cards can be used for playing word games as well as conventional card games.

The present invention, designed especially for preschoolers, is a phonics card game comprising in combination eight decks of letter cards, word cards and short- and long-vowel sound cards. This phonics card game is comprehensive and fun. As the players play with this card game, they see and name all the letters of the alphabet; they show the sequence of the alphabet; they separate vowel from consonant letters and have a special vowel and consonant category for W's and Y's; and they match lower-case letters with capital letters having the same name. As the players play with this card game they hear and say the short-and long-vowel words; and they see, clap, and say words with one or more syllables. The players can win this card game without using up all the cards in a deck. They merely have to have the most stars, which are exchanged for points earned when players say a letter or word correctly on the first try. As the players play with the present invention, they have fun, show what they know, and gain the rudiments of phonics.

A card game to facilitate the learning of spelling words. The card game is comprised of a number deck and a word deck. Players play the numbered cards and are then commanded to spell a word from a card from the word deck having a length equal to the additive sum of the numbered playing cards played.

A card game utilizes one or more modified decks of standard playing cards by eliminating the eights, nines and tens. The remaining spot cards (ace through seven) are valued at face value, while the face or court cards (kings, queens and jacks) are valued at one half point each. The object of the game is to draw a hand totaling seven and one half points, without exceeding that total. Various options are provided, including "splitting pairs," in which two equal value cards may be split into two hands at the beginning of play where the point values for the first card and the subsequent card are each less than four; "doubling down," in which a player may double the wager and receive one further card; or "surrendering," where a player may give up a portion of the wager at the beginning of play. Wagers are returned to the player in case of ties, rather than going to the dealer. The game is adaptable to casino play, electronic or computer play, and also to private play by individuals. A playing surface adapted specifically for the play of the present game is also provided.

A youth oriented alphabet learning card game is set forth in several generic-variants, the preferred embodiment featuring a special corner oriented arrangement of alphabetic indicia, in combination with a related key visual picture-pairing object illustration arranged centrally within the card format. Thus, on each individual card a different alphabet character is represented in both upper and lower case ("A" and "a" for example), preferably positioned upper-case immediately above lower-case. Additionally, the particular arrangement of card face graphics is such that it is essentially impossible for a youngster to hold the preferably rectangular cards in a manner in which some cards appear confusingly up-side down. An optional diamond card configuration offers the human-engineering advantage of the player's ability to now easily fan cards out at their upward ends to observe each individual alphabet letter, while the lower diamond-tip ends of the cards virtually converge into a V-formation, found more easily held in a small hand. Each alphabet-set or suit of cards is preferably identified via a colored-frame around the central object illustrations, there preferably being two suits to a game. The redeeming quality of this game residing in it's teaching of the alphabet, matching of objects, counting, phonics, spelling, and training of memory all without the learner experiencing boredom common in learning concentration disciplines.

SUMMARY OF THE PRESENT INVENTION

The present invention relates generally to card games and learning tools and, more specifically, to an educational card game and learning tool for teaching children how to correctly pronounce letters and words.

A primary object of the present invention is to provide an educational card game and learning tool that will overcome the shortcomings of prior art devices.

Another object of the present invention is to provide an educational card game and learning tool including specially designed playing cards including vowels and consonants printed thereon.

An additional object of the present invention is to provide an educational card game and learning tool which is able to teach basic language skills to children as they play card games with the specially designed deck.

A further object of the present invention is to provide an educational card game and learning tool which includes cards having concepts and keywords for use in teaching phonics, spelling, reading and writing to children printed thereon.

A yet further object of the present invention is to provide an educational card game and learning tool including a point scheme covering each card for use in game playing.

A still further object of the present invention is to provide an educational card game and learning tool including a recorded tape which follows along with the deck of cards for aiding children in learning phonics, spelling, reading and writing.

An even further object of the present invention is to provide an educational card game and learning tool able to accommodate playing of a plurality of card games such as gin, black jack, poker, etc. while providing an effective learning tool for both children and persons learning a language.

Another object of the present invention is to provide an educational card game and learning tool that is simple and easy to use.

A still further object of the present invention is to provide an educational card game and learning tool that is economical in cost to manufacture.

Additional objects of the present invention will appear as the description proceeds.

An educational card game for teaching phonetic pronunciation of words and letters is disclosed by the present invention. The educational card game includes a plurality of cards, each of the plurality of cards includes a face side and represents a different letter of the alphabet. The letter of the alphabet represented by each card is printed in a central portion of the face side and a point value assigned to each card is printed in a corner of the face side. A device for storing data representing an oral pronunciation of each letter printed on each of the plurality of cards is included to provide a correct oral pronunciation of each letter on each card. The device for storing data will include a pronunciation of the letter name, key word, letter sound, instructions on how to properly use the lips, tongue, teeth and voice to pronounce the sound, how and why to code the speech sound and oral instructions on how to write the letter. The data representing the phonetic pronunciation of each letter is assigned a respective location within the data storage device. A key is also included to match each of the plurality of cards with the location at which its respective data is stored whereby each of the plurality of cards represents a phonetic pronunciation of its respective letter, the point value assigned to each card is representative of a difficulty level of the phonetic pronunciation and a user may readily hear an oral pronunciation of the letter printed on each card by determining the position at which the appropriate data is stored on the data storage device using the key and retrieving the appropriate data from the data storage device.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
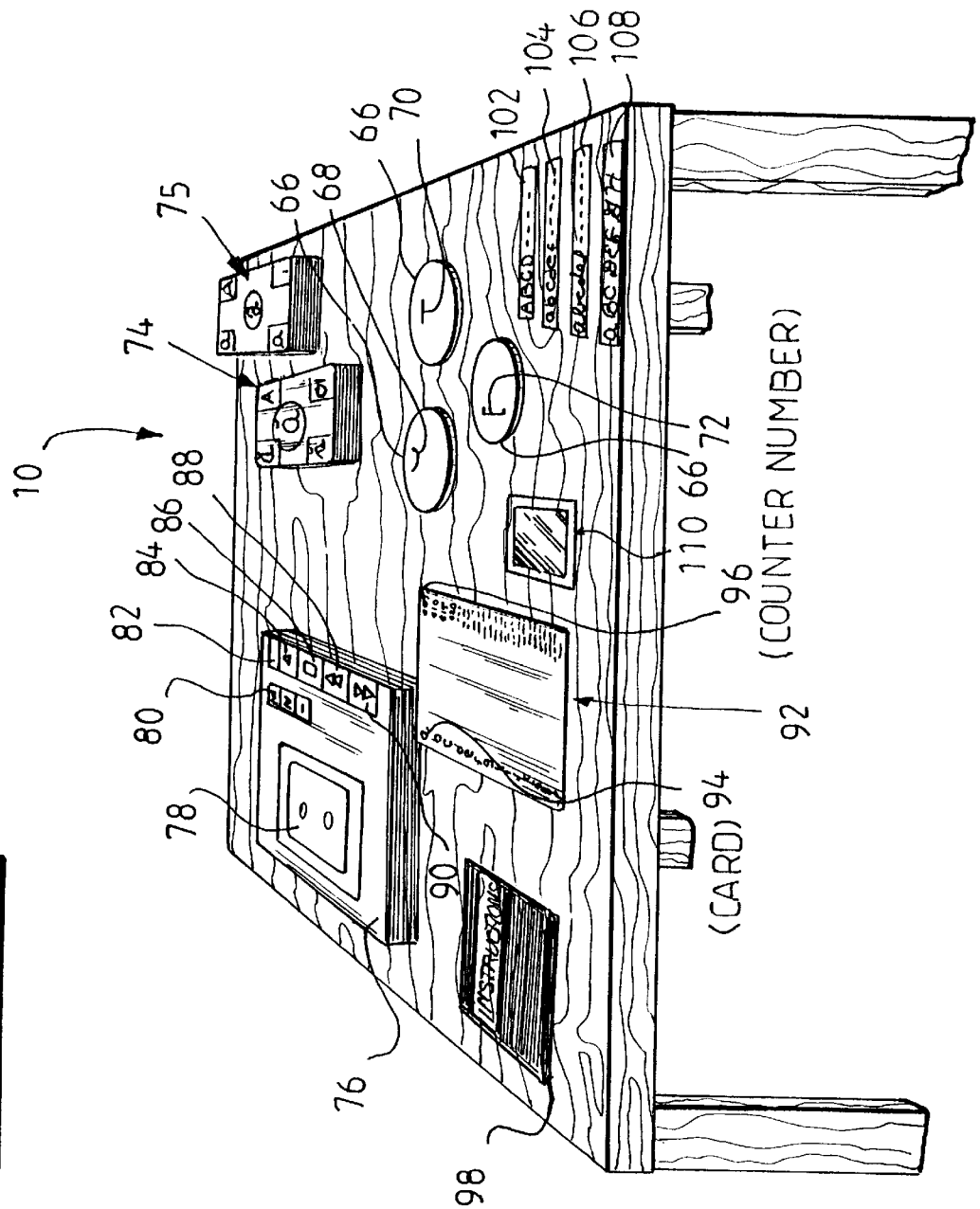
FIG. 1 is a perspective top view illustrating the entire system of the educational card game of the present invention.

Turning now descriptively to the drawings, in which similar reference characters denote similar elements throughout the several views, the Figures illustrate educational card game and learning tool of the present invention. With regard to the reference numerals used, the following numbering is used throughout the various drawing figures.

10 educational card game of the present invention
11 first beginners card used in educational card game of the present invention
12 lower case manuscript letter in center of card
13 breve atop lower case manuscript letter in center of card
14 lower case manuscript letter in top left corner of card
16 upper case manuscript letter in top right corner of card
18 lower case cursive letter in bottom left corner of card
20 picture for use in identifying sound of letter on first beginners card
21 point value awarded for identifying sound depicted on card in bottom right corner of first beginners card
22 first advanced card used in educational card game of the present invention
24 point value in bottom right corner of first advanced card
25 macron atop lower case manuscript letter in center of second beginners card
26 point value for identifying sound depicted on card in bottom right corner of second beginners card
27 picture for use in identifying sound of letter on second beginners card
28 second beginners card used in educational card game of present invention 30 second advanced card used in educational card game of present invention 32 lower case manuscript digraph in center of second advanced card 34 lower case manuscript digraph in upper left corner of second advanced card 36 upper case manuscript digraph in top right corner of second advanced card 38 lower case cursive digraph in bottom left corner of second advanced card 40 point value for digraph in bottom right corner of second advanced card 42 third advanced card used in educational card game of the present invention 44 lower case manuscript final stable syllable in center of third advanced card 46 lower case manuscript final stable syllable in upper left corner of third advanced card 48 upper case manuscript final stable syllable in top right corner of third advanced card 50 lower case cursive final stable syllable in bottom left corner of third advanced card 52 point value for final stable syllable in bottom right corner of third advanced card 54 box for storage and separation of cards 56 divider for separating cards for an individual student 58 divider for separating cards containing vowels 60 divider for separating cards containing consonants 62 divider for separating cards containing digraphs 64 divider for separating cards containing trigraphs 66 chip used to place over center of cards 68 breve printed on chip 70 bracket printed on chip 72 macron printed on chip 74 beginners deck of educational cards 75 advanced deck of educational cards 76 tape player 78 tape for use with associated deck of educational cards 80 counter on tape player 82 eject button 84 play button 86 stop button 88 fast forward button 90 rewind button 92 key card 94 list of cards in associated deck 96 counter number indicating position on tape for pronunciation of associated card 98 instruction book 100 box for storing advanced deck 102 alphabet strip illustrating alphabet in upper case manuscript letters 104 alphabet strip illustrating alphabet in lower case manuscript letters 106 alphabet strip illustrating alphabet in lower case cursive letters 108 alphabet strip illustrating alphabet in upper case cursive letters 110 pocket mirror 112 silent "e" printed in center of card 114 phonetic lower case manuscript representation of silent "e"

116 phonetic upper case manuscript representation of silent "e"

118 phonetic lower case cursive representation of silent "e"

120 picture indicating letter "e" on face of card is silent and worth 1 point 122 picture representing a first of the sounds produced by feature letter on card 124 picture representing a second of the sounds produced by feature letter on card 126 picture representing a third of the sounds produced by feature letter on card 128 picture representing a fourth of the sounds produced by feature letter on card 130 picture representing a fifth of the sounds produced by feature letter on card 132 picture representing a sixth of the sounds produced by feature letter on card

DETAILED DESCRIPTION OF THE PREFERRED EMBODIMENT

Turning now descriptively to the drawings, in which similar reference characters denote similar elements throughout the several views, FIGS. 1 through 9 illustrate the educational card game of the present invention indicated generally by the numeral 10.

The educational card game 10 includes a deck of beginner playing cards 74 and a deck of advanced playing cards 75; a tape player 76; a tape 78; a plurality of phonics chips 66; a key card 92; a plurality of alphabet strips illustrating the alphabet in upper case manuscript 102, lower case manuscript 104, lower case cursive 106 and upper case cursive 108; and a pocket mirror 110 so the user may view the mouth when pronouncing sounds. The use of either the beginner or advanced deck 74 or 75 is based upon the proficiency and knowledge level of the user. A young child or person beginning to learn the language will use the beginner deck 74 and will then continue with the advanced deck 75 as they become a more advanced student of the language. A user will be able to differentiate between the beginner and advanced decks 74 and 75 easily as each deck would include a distinctive design or color on the back side of the cards. The back side of the cards would also include a symbol indicating the correct way to hold the cards, i.e. right side up (not shown). The tape 78 is used in conjunction with the individual cards and the key card 92. At predetermined points on the tape 78 audio representations of the letter or letter groups printed on each card are recorded. The tape 78 will also include a pronunciation of the letter name, the key word, the letter sound, instructions on how to properly use the lips, tongue, teeth and voice to pronounce the sound, how and why to code the speech sound and oral instructions on how to write the letter A single tape 78 may be used for both the beginner and advanced decks or a separate tape 78 may be provided for each deck, both beginner and advanced 74 and 75. The key card 92 provides a counter number 96 matched with each card in the deck indicating at what point along a length of the tape 78 the audio representation of the letter or letter groups printed on each card is recorded. Thus, a user may quickly find the audio representation of a particular card by either fast forwarding or rewinding the tape 78 to the particular counter number indicated on the key card 92. The phonics chips 66 are for use with the advanced deck 75 as will be explained hereinafter. An instruction book 98 is also provided to guide the user through the games which may be played with the educational card game of the present invention.

Figure 2:
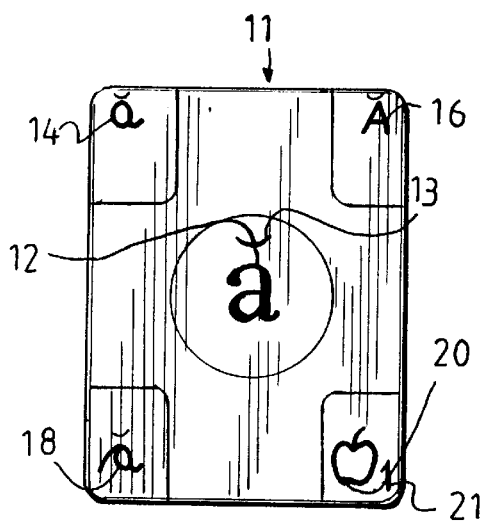
FIG. 2 is a front view of a first card used in the educational card game of the present invention.

Exemplary individual cards will now be discussed with reference to FIGS. 2–6a. Similar material printed in identical positions on each card will be identified by identical reference numerals. An exemplary card 11 for use with the beginners deck is illustrated in FIG. 2. This card 11 is preferably rectangular in shape in accordance with the shape of commonly known playing cards. However, the shape of the cards do not constitute part of the present invention and thus is not meant to be limiting on the scope of the present invention. Centrally positioned and printed on a front side of the card 11 is a lower case manuscript letter 12 and including a phonetic marking. The letter "a" is used for purposes of example. However, in a full deck of cards for use with the educational card game of the present invention each letter of the alphabet is represented on a card along with certain multiple letter combinations. The marking on the card of FIG. 2 is a breve 13. The breve 13 atop the letter "a" as depicted imparts a particular sound to the letter, i.e. a short sound, which is evident from the audio representation found on the tape 78 and is used for purposes of teaching a student of the language that each letter may be represented by a number of different sounds. Printed at the top left hand corner on the face of the card 11 is a lower case manuscript depiction of the letter printed in the center of the card including the phonetic symbol and is indicated by the number 14. An upper case manuscript depiction of the letter printed in the center of the card including the phonetic symbol is printed in the upper right hand corner of the face of the card and is indicated by the number 16. The numeral 18 indicates a lower case cursive depiction of the letter printed in the center of the card including the phonetic symbol. In the lower right hand corner of the card, a picture illustrating an item whose name produces the sound indicated by the letter and phonetic symbol when pronounced is printed and identified by the number 20. Also printed in the lower right hand corner of the card is a point value for use in game playing as will be described hereinafter. The point value is indicated by the numeral 21.

Figure 3:
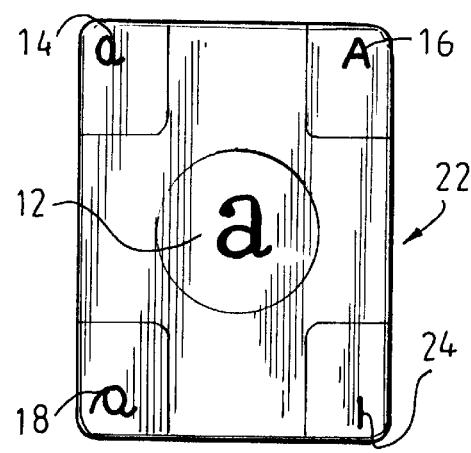
FIG. 3 is a front view of a second card used in the educational card game of the present invention.

An exemplary card 22 for use with the advanced deck is illustrated in FIG. 3. This card 22 is also preferably rectangular in shape in accordance with the shape of commonly known playing cards. However, the shape of the card does not constitute part of the present invention and thus is not meant to be limiting on the scope of the present invention. Centrally positioned on a front side of the card 22 is a lower case manuscript letter 12. Unlike the cards used in the beginners deck 74, the cards of the advanced deck 75 do not include a phonetic symbol. This allows the user or player to verbalize any or all of the possible sounds associated with the particular letter printed in the center of the card 22. This also provides for use of the phonics chips 66 which may be replaceably positioned atop the letter 12 and thus test the users knowledge of a particular phonetic symbol or each phonetic symbol with a single card. A description and use of the phonics chips 66 in conjunction with the cards will be discussed hereinafter. Printed at the top left hand corner of the face of the card 22 is a lower case manuscript depiction of the letter printed in the center of the card and is indicated by the number 14. An upper case manuscript depiction of the letter printed in the center of the card is printed in the upper right hand corner of the face of the card and is indicated by the number 16. The numeral 18 indicates a lower case cursive depiction of the letter printed in the center of the card. In the lower right hand corner of the card is a point value for use in game playing as will be described hereinafter. The point value for this card is indicated by the numeral 24.

Figure 4:
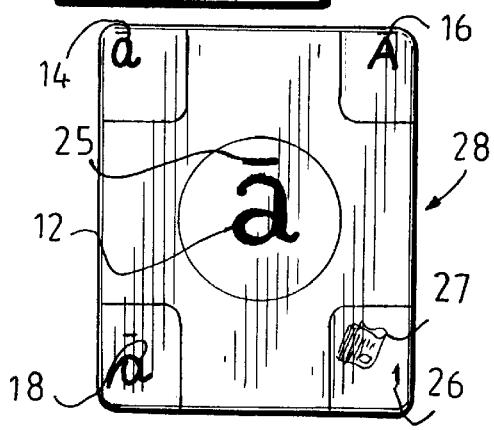
FIG. 4 is a front view of a third card used in the educational card game of the present invention.

A second exemplary card 28 for use with the beginners deck is illustrated in FIG. 4. Centrally positioned on a front side of the card 28 is a lower case manuscript letter 12 and including a phonetic marking, on the card of FIG. 4 the marking is a macron 25. The macron atop the letter "a" as depicted imparts a particular sound to the letter, i.e. a long sound. Printed at the top left hand corner of the face of the card 28 is a lower case manuscript depiction of the letter printed in the center of the card including the phonetic symbol and is indicated by the number 14. An upper case manuscript depiction of the letter printed in the center of the card including the phonetic symbol is printed in the upper right hand corner of the face of the card and is indicated by the number 16. The numeral 18 indicates a lower case cursive depiction of the letter printed in the center of the card including the phonetic symbol. In the lower right hand corner of the card, a picture illustrating an item whose name produces the sound indicated by the letter and phonetic symbol when pronounced is printed and identified by the number 27. Also printed in the lower right hand corner of the card is a point value for use in game playing as will be described hereinafter. The point value is indicated by the numeral 26.

Figure 5:
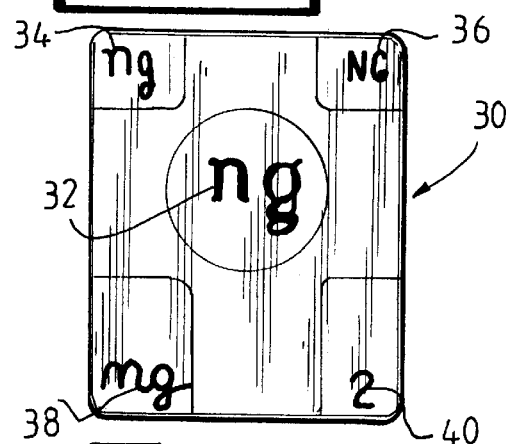
FIG. 5 is a front view of a fourth card used in the educational card game of the present invention.

A second exemplary card 30 for use with the advanced deck is illustrated in FIG. 5. Centrally positioned on a front side of the card 30 is a lower case manuscript digraph 32. A digraph is a two letter combination which produces a particular sound when pronounced together. Printed at the top left hand corner of the face of the card 22 is a lower case manuscript depiction of the digraph printed in the center of the card and is indicated by the number 34. An upper case manuscript depiction of the digraph printed in the center of the card is printed in the upper right hand corner of the face of the card and is indicated by the number 36. The numeral 38 indicates a lower case cursive depiction of the digraph printed in the center of the card. In the lower right hand corner of the card is a point value for use in game playing as will be described hereinafter. The point value for a digraph is 2 points and is indicated by the numeral 40.

Figure 6A:
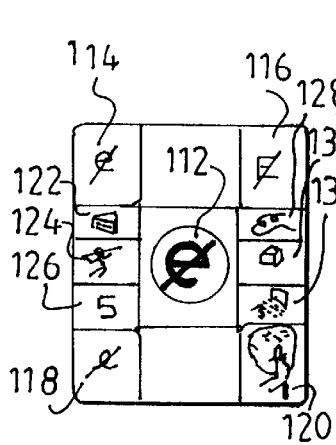
FIG. 6a is a front view of an exemplary card for a letter including a plurality of different pronunciations used in the educational card game of the present invention.
Figure 6:
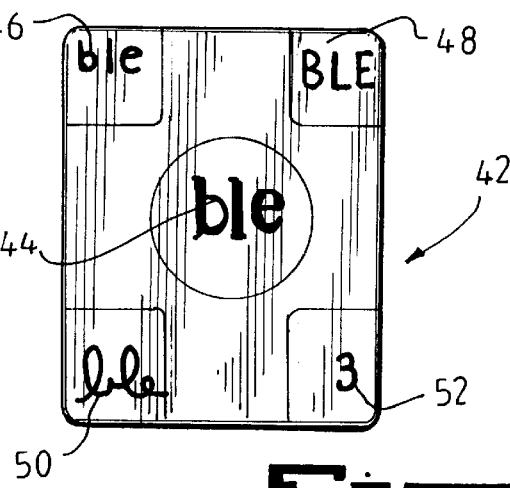
FIG. 6 is a front view of a fifth card used in the educational card game of the present invention.

A third exemplary card 42 for use with the advanced deck is illustrated in FIG. 6. Centrally positioned on a front side of the card 42 is a lower case manuscript final stable syllable 44. A final stable syllable is a letter combination located at the end of a word which always produces a particular sound, i.e. bubble. Printed at the top left hand corner of the face of the card 42 is a lower case manuscript depiction of the final stable syllable printed in the center of the card and is indicated by the number 46. An upper case manuscript depiction of the final stable syllable printed in the center of the card is printed in the upper right hand corner of the face of the card and is indicated by the number 48. The numeral 50 indicates a lower case cursive depiction of the letter printed in the center of the card. In the lower right hand corner of the card is a point value for use in game playing as will be described hereinafter. The point value for a final stable syllable is three points and is indicated by the numeral 52.

A card 42 illustrating a letter which may produce more than one sound is illustrated in FIG. 6a. The card illustrates a silent "e", the slash extending through the letter printed on the card indicating the letter is silent. This letter produces a number of different sounds based upon the letters in a particular word surrounding it Centrally positioned on a front side of the card is a lower case manuscript depiction of the letter "e" with a slash therethrough and indicated by the number 112. Printed at the top left hand corner of the face of the card is a lower case manuscript depiction of the silent "e" as printed in the center of the card and is indicated by the number 114. An upper case manuscript depiction of the silent "e" as printed in the center of the card is printed in the upper right hand corner of the face of the card and is indicated by the number 116. The numeral 118 indicates a lower case cursive depiction of the letter printed in the center of the card. In the lower right hand corner of the card is a picture of a person holding an index finger to the lip indicating the letter is silent and a point value of 1 point. This is indicated by the numeral 120. Along the length sides of the card are different pictures which depict the different sounds produced by this letter. The number 122 identifies a picture of a cake illustrating the silent "e" causes the letter "a" in the word to be pronounced as a long sound. The number 124 identifies a picture of an athlete illustrating the silent "e" causes the other letter "e" in the word to be pronounced as a long sound. The number 126 identifies a picture of a number five illustrating the silent "e" causes the letter "i" in the word to be pronounced as a long sound. The number 128 identifies a picture of a rope illustrating the silent "e" causes the letter "o" in the word to be pronounced as a long sound. The number 130 identifies a picture of a cube illustrating the silent "e" causes the letter "u" in the word to be pronounced as a long sound and the number 132 identifies a picture of hands typing on a computer illustrating the silent "e" causes the letter "y" in the word to be pronounced as a long sound.

Figure 9:
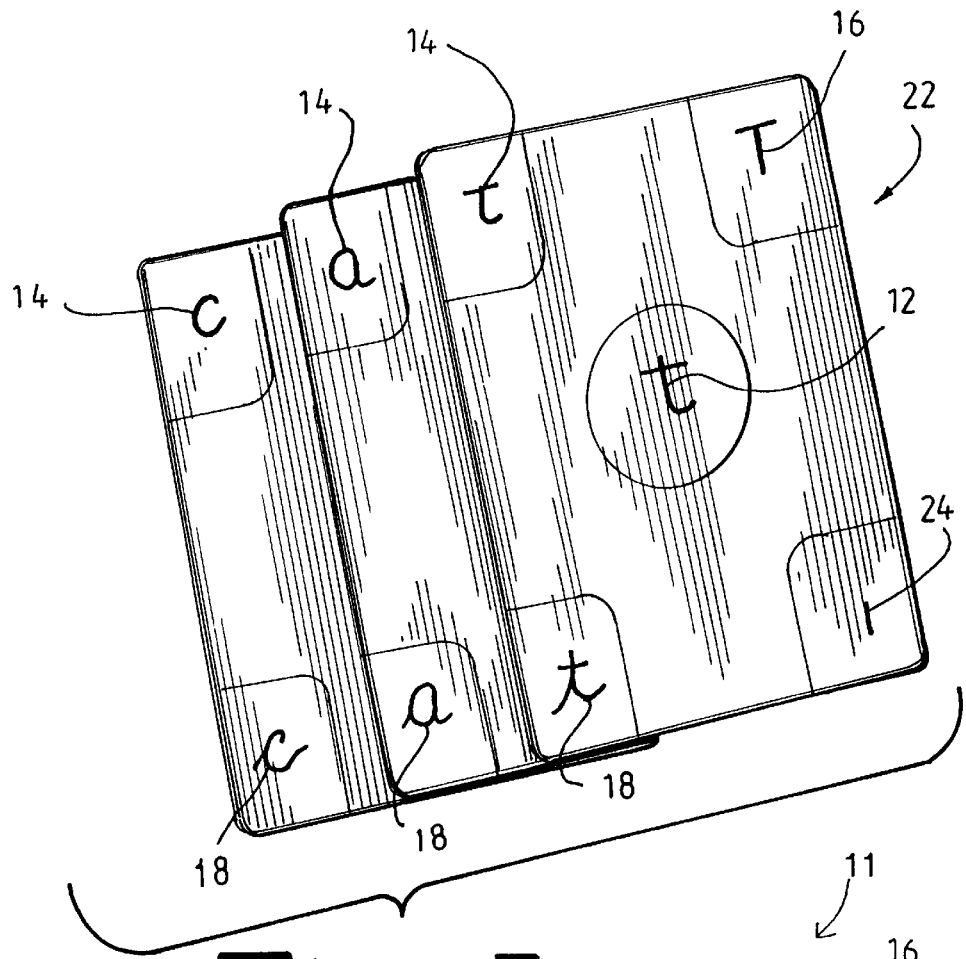
FIG. 9 is a front perspective view of three advanced cards of the educational card game of the present invention fanned together to spell a word using the letters in the top left corner.
Figure 9A:
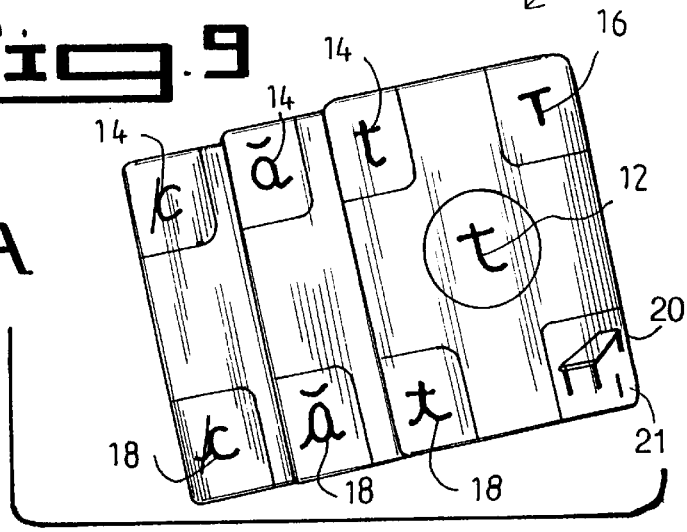
FIG. 9a is a front perspective view of three beginners cards of the educational card game of the present invention fanned together to spell a word using the letters in the top left corner.

When certain cards are held together and fanned out as illustrated in FIG. 9, they may be combined to spell a word. FIG. 9 illustrates the advanced cards for the letters "c", "a" and "t" held together to spell the word "cat". The beginners and advanced decks of playing cards can thus also be used to aid students of the language in learning to spell and read words. FIG. 9*a* illustrates the beginners cards held together and fanned out to spell the word "cat". The lower card for the letter "c" has a "k-back" in front of it to remind the student that the letter "c" in this word has a "k" sound as in the keyword "cup". The middle card for the letter "a" has a breve atop the letter to remind the student that the "a" has a short sound as in the keyword "apple". The keywords for the letters are represented as pictures and positioned on the bottom right hand side of the card as illustrated for the top card representing the letter "t". The picture for the cards representing the letters "c" and "a" are covered and thus not shown in these drawings.

Figure 7:
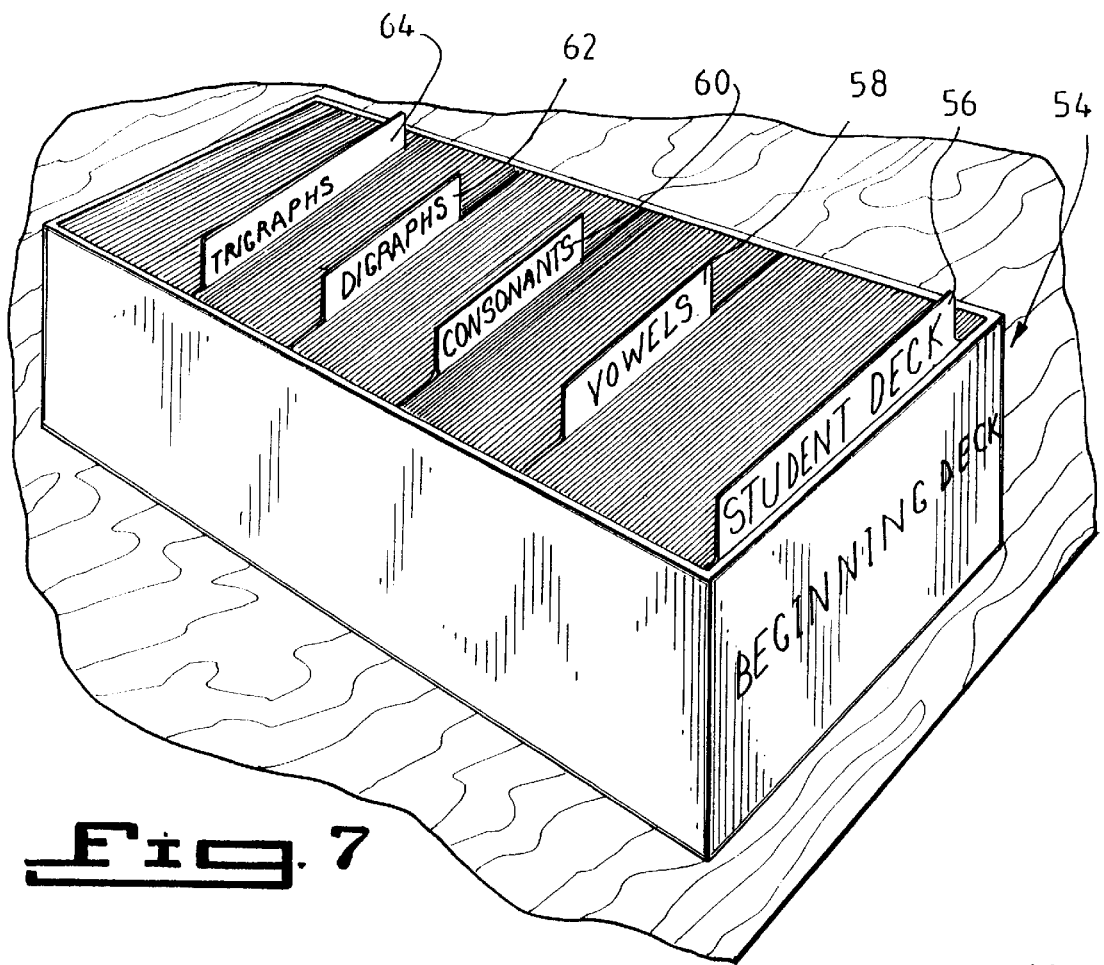
FIG. 7 is a top perspective view of the set of cards used in the beginners deck of the educational card game of the present invention separated by exemplary categories and positioned within a box.
Figure 7A:
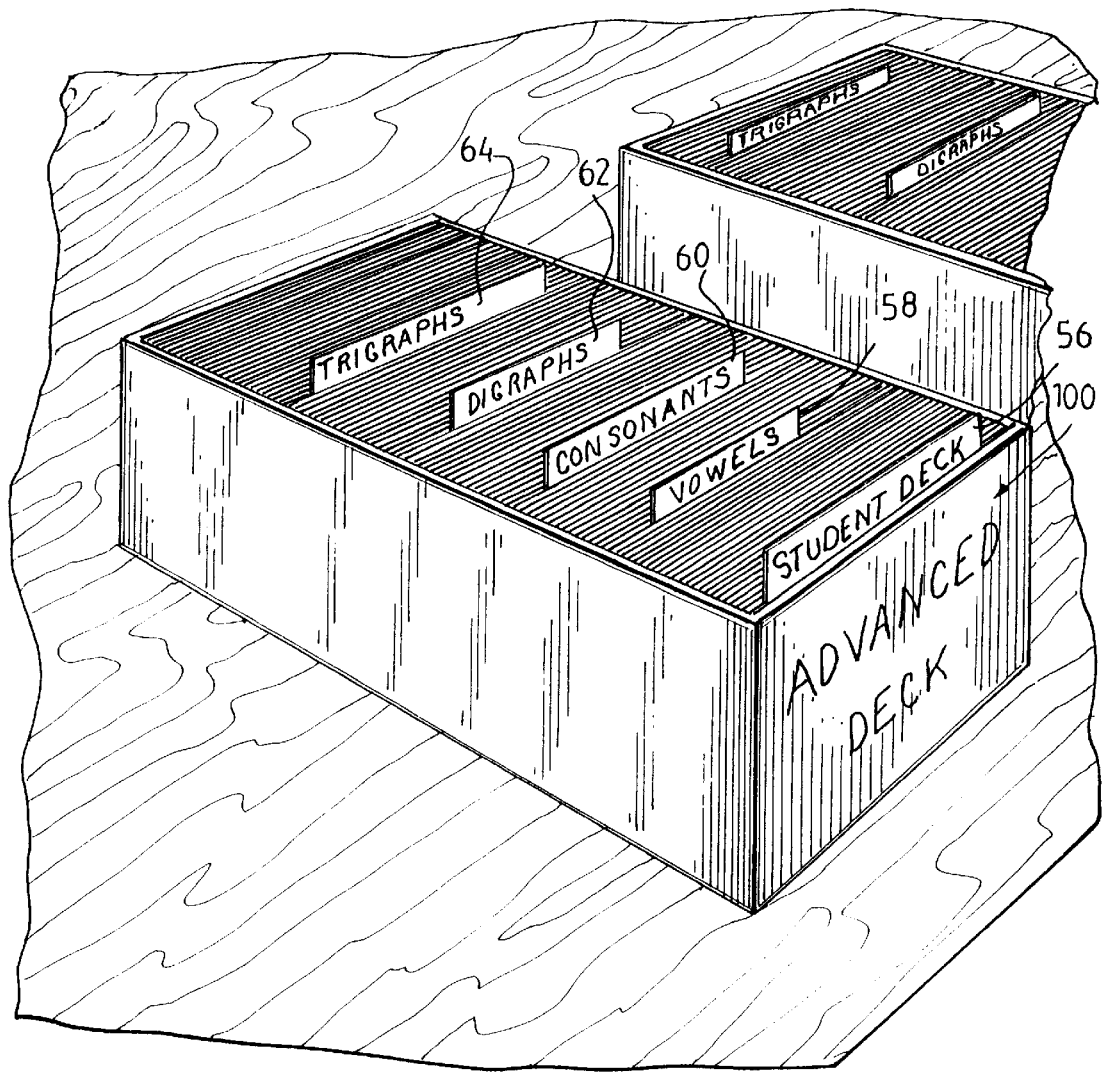
FIG. 7a is a top perspective view of the set of cards used in the advanced deck of the educational card game of the present invention separated by exemplary categories and positioned within a box.

The beginning and advanced decks are stored in respective boxes. The box 54 for the beginning deck 74 is illustrated in FIG. 7 and the box 100 for the advanced deck 75 is illustrated in FIG. 7*a*. Each box is separated into sections. Exemplary sections are separated by dividers such as vowels 58, consonants 60, digraphs 62 and trigraphs 64. An additional divider 56 is labeled "STUDENT DECK" and provides a section for storing cards for an individual student. Cards which the student is proficient with may be stored in this section. Alternatively, this section may be used to store cards which the user may need to learn. Such a divider individualizes the deck for a particular student. Additional cards containing diphthongs, combinations, suffixes, prefixes, final stable syllables and a number of instant words such as "and", "not", "or", etc. may also be produced and added to a deck. The storage box 54 or 100 may also include dividers for separating such cards.

Figure 8A:
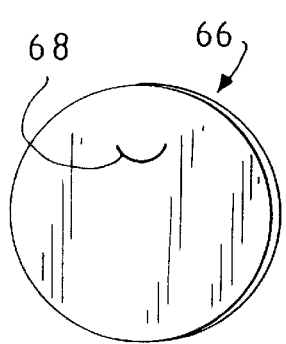
FIG. 8a is a top perspective view of a breve chip used with the educational card game of the present invention.
Figure 8B:
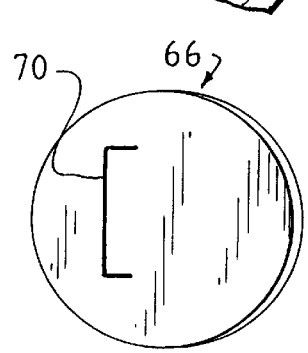
FIG. 8b is a top perspective view of a bracket chip used with the educational card game of the present invention.
Figure 8C:
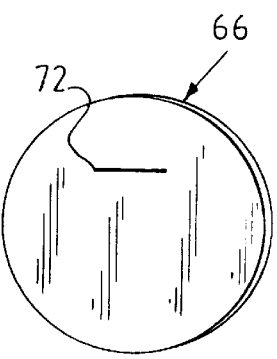
FIG. 8c is a top perspective view of a macron chip used with the educational card game of the present invention.

Exemplary phonetic chips 66 are illustrated in FIGS. 8*a*, 8*b* and 8*c*. These chips are only used for purposes of example and other chips 66 representative of all other phonetic symbols may be included with the game of the present invention. Each chip 66 is preferably circular in shape and sized to fit over the centrally positioned letter or letter group on the face of the cards of the advanced deck 75. The size of each chip 66 must be large enough to prevent a child from swallowing or choking on it. The phonetic chips 66 are made of a clear or colored material which is transparent so the letter or letter group positioned thereunder is visible. The phonetic chips 66 are preferably made of plastic or any other material which is both rigid and transparent so it may be placed atop the card, include a symbol printed thereon and be transparent so the letter or letter group may be viewed from beneath the phonetic chip 66. FIG. 8*a* illustrates a breve 68 printed on the face of the phonetic chip 66. The breve 68 indicates that the letter should be pronounced with a short sound. FIG. 8*b* shows a bracket 70 printed on the chip 66. The bracket 70 indicates that the letter group is the final stable syllable of a word. Printed on the phonetic chip 66 illustrated in FIG. 8*c* is a macron 72. The macron 72 indicates that the letter should be pronounced with a long sound. The shape of the phonetic chips 66 is not limited to a circular shape but may be rectangular, square, triangular or any other shape as long as it is able to cover the letter or letter group positioned centrally on the face of the card and correctly position the phonetic character printed thereon with respect to the letter or letter group.

FIG. 1 illustrates the entire educational card game for use in learning phonetic pronunciation. The game 10 includes both the beginning deck 74 and the advanced deck 75. When the advanced deck 75 is used, the phonetic chips 66 are also used for dictating a particular pronunciation of the letter or letter group printed on each card. Each of the decks, the beginners 74 and advanced 75, are associated with a personalized cassette tape 78.

The cassette tape 78 includes an oral pronunciation of all sounds associated with the cards of the deck being used. Use of a cassette tape is for purposes of example only. In practice any form of oral recording media such as a phonograph record, compact disk, computer accessory, etc. on which the oral representation of the cards may be recorded and played back so that a user may listen to the correct pronunciation of the letter or letter groups printed on each card. The tape 78 is placed in a tape player 76 for orally reading the information recorded thereon. The tape player 76 includes a counter 80 for indicating the point along the length of the tape 78 which is positioned to be read by the tape player 76. The tape player 76 also includes a play button 84 for playing the tape 78, a stop button 86 for halting play of the tape 78, a fast forward button 88 for winding the tape 78 quickly to a desired point indicated by the counter 80 and a rewind button 90 for rewinding the tape 78 to a desired position indicated by the counter 80. The tape player 76 also includes an eject button 82 for ejecting the tape 78 when finished.

A key card 92 includes a first column 94 listing the different cards contained in the deck and a second column 96 indicating a counter position on the tape 78 where the oral representation of the indicated card is located. The key card 92, tape 78 and deck of cards 74 or 75 are all used together when playing this game. Also included is an instruction book 98 for describing the different uses of and the different games which can be played with the educational card game of the present invention.

The operation of the educational card game will now be described with reference to the figures. In operation, the educational card game is supplied in a box of both beginner cards 74 and advanced cards 75. A tape 78 associated with each individual deck of cards 74 or 75 is also supplied along with a key card 92 indicating where an oral pronunciation of each card can be found on the tape 78. In order to play the educational card game with a beginners deck 74, the cards which are desired to be used are removed from the storage box 54. Any combination of cards may be removed, e.g. vowels, consonants, digraphs, final stable syllable, diphthongs, combinations, prefixes, suffixes, instant words, or any combination thereof, etc. The tape 78 is then placed in the tape player 76 and rewound to its beginning. The counter 80 is then reset so that the position of the tape 78 is aligned with the counter 80 and the key card 92. The game is now ready to begin play.

A card is removed from the beginners deck 74 and placed face up on the playing surface so it may be viewed by the player or players. The players are next given an opportunity to pronounce the letter name and the sound indicated on the card. Once the player or a first one of the players pronounces the letter name and the sound that player will be awarded the amount of points indicated in the lower right hand corner of the card. The players may also be provided an opportunity to pronounce the word identifying the picture in the lower right hand corner of the card. If it is desired to check the pronunciation of the sound, the letter or letter group printed in the center of the card is compared to the list in the first column 94 of the key card 92. The first column 94 of the key card 92 includes a list of all cards in the deck 74 and an associated counter number for locating the pronunciation on the tape 78. The counter number in the second column 96 associated with that card is then located. Once the counter number is located, the counter 80 on the tape player 76 is checked to determine whether the tape must be wound or rewound to a position aligned with the desired counter number. The tape player 76 is then activated to align the counter 80 with the desired counter number and the tape 78 is played. If the sound made by the player is the same as the sound played by the tape player 76 then it is determined that the player can identify the letter or letter group printed on the card and that player is awarded the amount of points indicated in the lower right hand corner of the card. This card may now be placed in the student deck portion of the storage box 54 indicating the player knows the information contained on that card. If the player pronounces the sound differently from the tape player 76 then it can be determined that the player does not know the information contained on the card and another player may be given the opportunity to pronounce the sound. If another player is able to pronounce the sound the point value associated with that card is awarded to that player. If none of the players are able to identify the sound then the players can be given an opportunity to pronounce the word identifying the picture printed in the lower right hand corner of the card. For each card a player correctly pronounces the sound and word identifying the picture a point value equivalent to the value printed in the lower right hand corner of the card will be awarded. If none of the players are able to pronounce the sound or word associated with the picture the card should be placed back in the deck 74. This will continue until all the cards have been viewed by the player(s) or until the player(s) correctly identifies the sounds on all cards. When more than one player is identifying the sounds the point values will be accumulated over the period viewing all cards and the player with the most points will win the game. If a single player is viewing the cards, the cards which are correctly identified may be placed in the student deck portion of the storage box 54 to separate them from the other cards. Those cards can then be used at a later time to reinforce the player's knowledge of those cards. Due to the design and printing on the face of the cards, the cards may be combined in an overlapping manner so that the cards can spell out any desired word. This will aid the player in identifying and pronouncing words.

A plurality of cards may also be used at a single time and combined in a fanned fashion as illustrated in FIGS. 9 and 9a to spell words. The student learning the language can either combine the cards on their own or the person aiding the student may combine the cards and allow the student to pronounce the spelled word.

Use of the advanced deck is similar to that of the beginners deck 74 however the advanced deck 75 does not include the printed phonetic symbols on the cards. With the advanced deck 75, once the card is placed on the playing area for viewing by the player or players, a phonetic chip 66 may be positioned atop the centrally printed letter or letter group to change the sound of the letter or letter group. Alternatively, the player or players may simply pronounce all possible sounds made by the letter or letter group. Again, once the player or players view all cards in the deck or correctly pronounce all sounds represented by all cards in the deck the game is complete and the player with the most points wins. This game may be played over and over again to either reinforce the phonetic ability of the player(s) to pronounce sounds or to continually teach a player the basics of the language.

This game can be used for teaching any phonetic language by simply producing cards containing the alphabet of the desired language and the equivalent of digraphs, final stable syllable, diphthongs, combinations, prefixes, suffixes, etc. associated with the desired language. A tape and key card designed for the set of cards must also be produced. The associated instruction books would be printed in the relevant language.

As previously indicated, the deck of cards used in the present invention may be used to play any known card game. To this end, a set of four cards each having a different color on their face side are provided with each deck. Furthermore, the cards in the deck must be identified with a particular card in a known playing deck of cards, e.g. an "a" can be used as an ace, a "b" as a two, a "c" as a three, etc. and any desired unassigned card can be used as a jack, queen and king. Each different color can be used to define any of the four suits in a deck of playing cards. By equating the cards in this manner and since the educational card game of the present invention includes four different colors for each card and includes one card for each letter of the alphabet and additional cards for letter combinations, there are more than enough cards in a playing deck of the present invention to cover all possible cards in a playing deck and thus allow for playing of any known card game.

From the above description it can be seen that the educational card game of the present invention is able to overcome the shortcomings of prior art devices by providing a card game and learning tool including a specially designed advanced deck of playing cards including vowels and consonants printed thereon and a beginning deck including cards with concepts and keywords printed thereon for use in teaching phonics, spelling, reading and writing to children. The card game and learning tool is able to teach basic language skills to children as they play card games with the specially designed deck and includes a point scheme covering each card for use in game playing including a recorded tape which follows along with the deck of cards for aiding children in learning phonics, spelling, reading and writing. The card game and learning tool of the present invention is also able to accommodate playing of a plurality of card games such as gin, black jack, poker, etc. while providing an effective learning tool for both children and persons learning a language. Furthermore, the card game and learning tool of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An educational card game for two or more players for teaching phonetic pronunciation of words and letters, said educational card game comprising:
   a) a deck of cards, each of said cards including a face side and representing a different letter of the alphabet, the letter of the alphabet represented by each card being printed in a central portion of said face side and a point value assigned to each card being positioned in a corner of said face side;
   b) means comprising a tape for storing data representing an oral pronunciation of each letter printed on each of said cards, said data for each letter being assigned a predetermined location within said tape;
   c) means comprising a tape player for retrieving said data from said tape and producing an oral signal representative of said retrieved data;
   d) a key for correlating each of said cards with its respective data location within said tape;
   e) said deck of cards available for removal one card at a time for viewing by said players who are given the opportunity to pronounce the letter on the removed card and comparing the pronunciation with the pronunciation on said tape; and
   f) whereby each player collects the cards in which said player correctly pronounced the letters on said cards so that the player with the most points totalled from the point values on the collected cards is the winner of the game.

2. The educational card game as recited in claim 1, wherein predetermined cards include a digraph printed in a central portion of said face side.

3. The educational card game as recited in claim 1, wherein predetermined cards include a final stable syllable printed in a central portion of said face side.

4. The educational card game as recited in claim 1, further comprising a transparent chips each including a phonetic symbol printed thereon for placement over said letter printed on a desired one of said plurality of cards to represent a particular sound produced by pronouncing said letter.

5. The educational card game as recited in claim 1, wherein predetermined cards include an instant word printed in a central portion of said face side.

6. The educational card game as recited in claim 1, wherein said cards include a plurality of sets of four cards each set representing an identical letter of the alphabet and including a face of a different color representing a different suit.

7. The educational card game as recited in claim 1, each of said cards further comprises a phonetic symbol printed on a central portion of said face side to indicate a particular sound represented by said letter printed thereon.

8. The educational card game as recited in claim 7, wherein each of said cards further includes a picture, said picture being representative of a word which, when pronounced produces said sound represented by said card.

9. The method of playing an educational card game for two or more players for teaching phonetic pronunciation of words and letters comprising the steps of:
   a) assembling a deck of cards, each of said cards including a face side and representing a different letter of the alphabet, the letter of the alphabet represented by each card being printed in a central portion of said face side and a point value assigned to each card being positioned in a corner of said face side;
   b) drawing one card at a time and giving each of said players the opportunity to pronounce the letter on the drawn card;
   c) comparing the pronunciation by said player of the letter of the drawn card with the pronunciation of the letter on the drawn card pre-recorded on a tape by playing said tape on a tape player, said tape containing stored data representing an oral pronunciation of each letter printed on each of said cards, said data for each letter being assigned a predetermined location within said tape and using a key to obtain the location of the pronunciation corresponding to the letter on the drawn card; and
   d) collecting for each player the cards in which said player correctly pronounced the letters on said cards so that the player with the most points totalled on the collected cards is the winner of the game.

10. The method of claim 9 in which transparent chips each having a phonetic symbol thereon is placed on a letter on a card to help with the pronunciation thereof.

11. The method of claim 9 in which said cards are divided into sets of four, each card in a set having an identical letter and a different color to indicate a suit so that said cards may be employed to play other card games.

* * * * *